United States Patent Office 2,766,227
Patented Oct. 9, 1956

2,766,227

SULFONYLTRIAZENES

William Baptist Hardy and Frederic Henry Adams, Bound Brook, N. J., assignors to American Cyanamid Company, New York, N. Y., a corporation of Maine No Drawing. Application December 14, 1954, Serial No. 475,286

6 Claims. (Cl. 260—140)

This invention relates to new compounds. More particularly, it relates to N-substituted sulfonyltriazenes. Still more specifically it relates to N-cyanoalkyl sulfonyltriazenes.

The N-cyanoalkyl sulfonyltriazenes in accordance with this invention may be represented by the formula

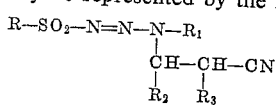

in which R is an organic radical such as, for instance, aliphatic, cycloalkyl, aralkyl, aryl and heterocyclic which may be substituted; $R_1$ is an aryl or heterocyclic radical which may be substituted; and $R_2$ and $R_3$ are hydrogen or lower alkyls of 1–4 carbon atoms.

These new compounds find application in various fields. For instance, they are useful in the fields of pharmaceuticals, dyes, rubber processing and the like. Specifically, it has been found that these compounds are particularly useful as blowing agents in the preparation of cellular organoplastic materials. The process of preparing such cellular organoplastic materials forms the subject matter of applicants' copending application for U. S. Letters Patent, Serial No. 475,284 filed of even date.

In preparation of the new sulfonyltriazenes, a sulfonamide is reacted with a diazo compound to form the intermediate diazoamido compound. The latter is then cyanoalkylated by reacting it with an acrylonitrile. The latter reaction is conducted in an alkaline medium, preferably aqueous, using at least a stoichiometrically equivalent amount of the acrylonitrile. In some instances, improved results are obtained using an excess of the acrylonitrile. Alkalinity of the reaction mass must be maintained and can be controlled by the addition, if necessary, of an alkali such as sodium or potassium hydroxide. The reaction temperature may be as high as 60° C. and even higher but preferably is maintained at less than 30° C., best results being obtained at from 0°–15° C. The described process forms the subject matter of applicants' copending application for U. S. Letters Patent, Serial No. 475,283.

In preparing the intermediate diazoamino compound employed in the process of this invention, various sulfonamides may be employed. These may include, for instance, cycloalkylsulfonamides such as cyclohexanesulfonamide and the like; aralkylsulfonamides such as phenylmethanesulfonamide, phenylethanesulfonamide, and 2-, 3- or 4-nitrophenylmethanesulfonamide; arylsulfonamides such as benzenesulfonamide, o-, m- and p-ethylbenzenesufonamides, o-, m- and p-chlorobenzenesulfonamides, o-, m- and p-methylbenzenesulfonamides, o-xylene-, 3-, 4- and 5-sulfonamides, biphenyl-4-sulfonamide, 1- and 2-naphthalenesulfonamides, 1-nitro-, 3-, 4-, 5-, 6-, 7- and 8-naphthaline sulfonamides, 1-acetoxynaphthalene-6-sulfonamide, 2-chloronaphthalene-6-sulfonamide, anthracene-1- and 2-sulfonamides, phenanthrene-2-, 3- and 9-sulfonamides and acenaphthene-3-sulfonamide; and heterocyclic sulfonamides such as 3-pyridine-sulfonamide, quinoline-5-sulfonamide, isoquinoline-5- or 8-sulfonamide, benzimidazole-5-sulfonamide, 2-acetoxycarbazole-7-sulfonamide, 1,2-benzocarbazole-3-sulfonamides, dibenzofurane-2-sulfonamide, dibenzothiophene-2-sulfonamide, 2-acetamidothiazole-5-sulfonamide, 5-acetamido-2-thiadiazole sulfonamide, and the like.

As the diazo component in the preparation of the intermediate diazoamido compound, there may be used the diazo compound prepared from any of various aromatic amines of the aromatic and heterocyclic series. Amines of the benzene and naphthalene series are preferred. For example, the o-, m- and p-substitution products of aniline such as the o-, m- and p-methoxy, methyl and chloro derivitives. Di and poly substituted anilines, may be used such as o-, m- and p-xylidines, and 4-benzoylamino-2,5-diethoxyaniline. A similar range of naphthalene diazo compounds may be used such as those derived from 1- or 2-naphthylamine or 4-methyl-1-naphthylamine, 4-ethyl-1-naphthylamine, 4-methyl-2-naphthylamine, 4-ethyl-2-naphthylamine, and the like.

The acrylonitrile which may be employed in accordance with the process of this invention may be represented by the formula:

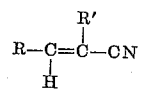

in which R and R' may be hydrogen or a lower alkyl radical of 1–4 carbon atoms. In addition to acrylonitrile itself, there may be employed, for instance, methacrylonitrile, crotononitrile, β-ethyl acrylonitrile, β-isopropylacrylonitrile, β-isobutylacrylonitrile, and the like.

Preparation of compounds of this invention is demonstrated by the following examples, which are intended to be illustrative only and not by way of limitation. Unless otherwise noted, all parts are by weight.

EXAMPLE 1

*3-beta-cyanoethyl-3-phenyl-1-benzenesulfonyltriazene*

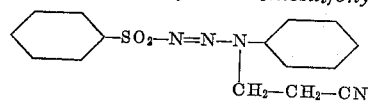

A benzene diazonium chloride solution was prepared by adding a solution comprising 21 parts of sodium nitrite in 40 parts of water to a solution comprising 28 parts of aniline, 125 parts of water and 107 parts of 37% HCl at 0°–5° C. The benzene diazonium chloride solution was then added, at 0–5° C. and with stirring, to a solution comprising 120 parts of 50% NaOH in 2000 parts of water to which had been added 48 parts of benzene sulfonamide. To the resultant solution was slowly added, with stirring, 80 parts of acrylonitrile and stirring continued until reaction was complete, temperature being maintained at less than 5° C. The product was isolated by filtration, washed and dried, M. P. 109–111° C.

EXAMPLE 2

*3-beta-cyanoethyl-3-phenyl-1-(para-tolyl)sulfonyltriazene*

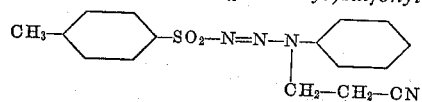

To a solution comprising 74.4 parts an aniline, 330 parts of water and 240 parts of 37% hydrochloric acid is added at about 0.5° C. 166 parts of 5N sodium nitrite solution. This is then added, at 0–5 C., and with stirring, to a solution comprising 323 parts of 50% sodium hydroxide, 5500 parts of water and 144 parts of para-toluene-sulfonamide. There is then added, slowly with stirring, 213 parts of acrylonitrile, the mixture stirred and allowed to stand at room temperature until the reaction is substantially complete. The product was isolated by filtration, washed with water and dried, M. P. 110° C.

EXAMPLE 3

*3-beta-cyanoethyl-3-(para - chlorophenyl) - 1 - benzene-sulfonyltriazene*

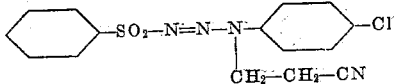

To a solution comprising 38.3 parts of para-chloroaniline 140 parts of water and 90 parts of 37% hydrochloric acid was added at about 0.5° C. a solution of 21 parts of sodium nitrate in 40 parts of water. This solution was then added, with stirring and at 0–5° C. to caustic solution comprising 122 parts of 50% sodium hydroxide, 200 parts of water and 50 parts of paratoluene sulfonamide. There was then added, slowly with stirring, 48 parts of acrylonitrile and the mixture stirred until the reaction was substantially complete, keeping the temperature below 5° C. The product was isolated by filtration, washed with water and dried, M. P. 127–129° C.

EXAMPLE 4

*3-β-cyanoethyl-3-p-tolyl-1-(5-acetamido - 2 - thiadiazole-sulfonyl)-triazene*

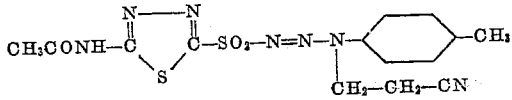

A solution of p-toluidine diazo was prepared by icing a mixture of 21.4 parts p-toluidine with 150 parts water and 716 parts of 37.5% hydrochloric acid and then adding 40 parts by volume of a sodium nitrite solution containing 20.7 parts of sodium nitrite. The solution of diazo was slowly added to a solution made by adding 38 parts of 5-acetamido-2-thiadiazolesulfonamide to 1700 parts of water and 80.6 parts of 50% sodium hydroxide solution and icing. To the resultant solution of 3-p-tolyl-1-(5-acetamide-2-thiadiazolesulfonyl)-triazene was added a solution made by mixing 54 parts of acrylonitrile with 54 parts of water. Addition was gradual and the mixture stirred about five hours at a temperature of 20–25° C. The cyanoethylated product was isolated by filtration, washed with water until free of alkalinity and dried.

EXAMPLE 5

*3-(β-cyanopropyl)-3-phenyl-1-benzenesulfonyltriazene*

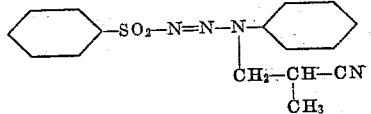

The procedure of Example 1 is repeated except 101 parts of methacrylonitrile are substituted for the acrylonitrile. The reaction product was 3-(β-cyanopropyl)-3-phenyl-1 benzenesulfonyltriazene.

EXAMPLE 6

*3-(β-cyano-α-methyl-ethyl)-3-phenyl-1-(p-toluene-sulfonyltriazene)*

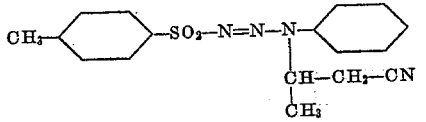

The procedure of Example 2 is repeated replacing the acrylonitrile with 268 parts of crotononitrile. The product obtained is 3-(β-cyano-α-methyl-ethyl)-3-phenyl-1-(p-toluenesulfonyltriazene).

EXAMPLE 7

*3-β-cyanoethyl-3-p-chlorophenyl-1-(β-naphthalene-sulfonyltriazene)*

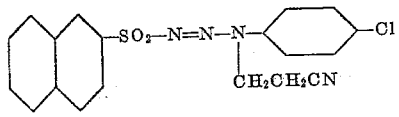

Example 3 is repeated using, instead of 50 parts of p-toluenesulfonamide, 62.2 parts of naphthalene-2-sulfonamide. The product obtained is 3-β-cyanoethyl-3-p-chlorophenyl-1-(β-naphthalenesulfonyltriazene).

In order to illustrate the utility of the compounds of this invention, their use in the preparation of cellular polymeric material is described in the following example.

EXAMPLE 8

Rubber stocks containing the compound of Examples 1, 2, and 3 as blowing agents were compounded according to the following composition:

| Compound: | Parts |
|---|---|
| Plasticized rubber | 100 |
| Stearic acid | 2 |
| Zinc oxide | 5 |
| Keystone whiting | 50 |
| Unitane O–220 | 15 |
| Light process aid | 10 |
| Petrolatum | 3 |
| 2,2' - methylene - bis - (4-methyl-6-t-butylphenol) | 0.5 |
| Sulfur | 3 |
| Bis-benzothiazole disulfide | 0.6 |
| Di-o-tolyl guanidine | 0.15 |
| Blowing agent | 1.5 |

Samples of each stock were blown at 153° C. for 35 minutes and 130° C. for 60 minutes. The mold size was 6 cubic inches and both high and low loads were used for each stock. In the case of white stock the respective portions for high and low loads are 51 grams and 42 grams. For neutral colored stock they are 48.5 grams and 40 grams. In each instance, a completely blown, substantially colorless product of uniform fine cell structure is obtained.

We claim:

1. N-cyanoalkylsulfonyltriazenes of the formula $$R-SO_2-N=N-N-R_1$$
$$\qquad\qquad\qquad |$$
$$\qquad\qquad\qquad CH-CH-CN$$
$$\qquad\qquad\qquad |\quad\;\; |$$
$$\qquad\qquad\qquad R_2\quad R_3$$

in which R is selected from the group consisting of aryl radicals of the benzene and naphthalene series and thiadiazolyl radicals, $R_1$ is an aryl radical of the benzene and naphthalene series, and $R_2$ and $R_3$ are selected from the group consisting of hydrogen and alkyls of 1–4 carbon atoms.

2. Compound of the formula

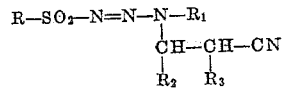

3. Compound of the formula

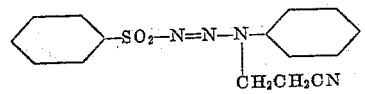

4. Compound of the formula

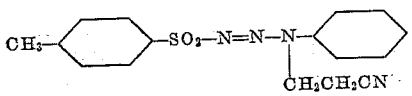

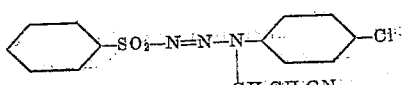

5. Compound of the formula
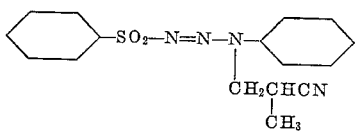
6. Compound of the formula
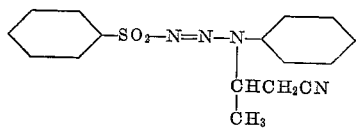
References Cited in the file of this patent
UNITED STATES PATENTS
| | | |
|---|---|---|
| 2,117,251 | Kleiderer et al. | May 10, 1938 |
| 2,402,611 | Dickey et al. | June 25, 1946 |